United States Patent
Elend et al.

(10) Patent No.: US 12,316,733 B2
(45) Date of Patent: May 27, 2025

(54) ETHERNET TRANSCEIVER CODING MODULE

(71) Applicant: NXP B.V., Eindhoven (NL)

(72) Inventors: Bernd Uwe Gerhard Elend, Hamburg (DE); Gerrit Willem den Besten, Eindhoven (NL); Rigor Hendrikus Lambertus van der Heijden, Elst (NL)

(73) Assignee: NXP B.V., Eindhoven (NL)

( * ) Notice: Subject to any disclaimer, the term of this patent is extended or adjusted under 35 U.S.C. 154(b) by 83 days.

(21) Appl. No.: 18/309,652

(22) Filed: Apr. 28, 2023

(65) Prior Publication Data
US 2023/0370243 A1 Nov. 16, 2023

(30) Foreign Application Priority Data
May 13, 2022 (EP) .................................... 22173352

(51) Int. Cl.
*H04B 1/38* (2015.01)
*H04L 5/16* (2006.01)
*H04L 7/04* (2006.01)

(52) U.S. Cl.
CPC ........ *H04L 7/041* (2013.01); *H04L 2007/045* (2013.01)

(58) Field of Classification Search
CPC ............... H04L 7/041; H04L 2007/045; H04L 25/4915; G06F 11/10
USPC ........ 375/219, 220, 222, 257, 258, 292, 282
See application file for complete search history.

(56) References Cited

U.S. PATENT DOCUMENTS

| 11,616,861 B1* | 3/2023 | de Haas | H04L 25/4915 |
| | | | 375/316 |
| 2004/0075594 A1 | 4/2004 | Kuo et al. | |
| 2012/0324320 A1* | 12/2012 | Terabe | G06F 11/10 |
| | | | 375/295 |

FOREIGN PATENT DOCUMENTS

| EP | 1783951 A2 | 5/2007 |
| EP | 1783951 A3 | 5/2007 |

OTHER PUBLICATIONS

Beruto, Piergiorgio et al.; "OPEN Alliance 10BASE-T1S PMD Transciever Interface"; OPEN Alliance TC14-Interoperability Specifications; 48 pages; Nov. 8, 2022.

(Continued)

*Primary Examiner* — Phuong Phu (57) ABSTRACT

The disclosure relates to a coding module for an Ethernet transceiver. The coding module may include circuitry configured to: receive data-signaling representative of one or more data words; encode the data-signaling into one or more DC-balanced words each having a DC-balanced-word-length; provide a prepended-word for a first transmission, where a length of the prepended-word is at least as long as the DC-balanced-word-length; and provide the one or more DC-balanced words for a second transmission, where the second transmission is subsequent to the first transmission. The coding module may include circuitry configured to: receive a prepended-word and provide a logic-high signal to an Energy Detect terminal; receive one or more DC-balanced words each having a DC-balanced-word-length; remove a DC-balanced coding from the one or more DC-balanced words to generate data signaling representative of one or more data words; and provide the data signaling to an output terminal.

18 Claims, 6 Drawing Sheets

(56) References Cited

OTHER PUBLICATIONS

LAN/MAN Standards Committee of the IEEE Computer Society, "IEEE P802.3cg?/D3.4 Draft Standard for Ethernet, Amendment 5: Physical Layer Specifications and Management Parameters for 10Mb/s Operation and Associated Power Delivery over a Single Balanced Pair of Conductors", IEEE Draft, Sep. 12, 2019, pp. 1-216, vol. 802.3cg drafts, No. D3.4, retrieved from the internet at http://grouper.ieee.org/groups/802/3/cg/private/8023cg_D3p4_CMP_Allpages.pdf on Sep. 12, 2019.

\* cited by examiner

ETHERNET TRANSCEIVER CODING MODULE

CROSS-REFERENCE TO RELATED APPLICATIONS

This application claims the priority under 35 U.S.C. § 119 of European patent application no. 22173352.0, filed on 13 May 2022 the contents of which are incorporated by reference herein.

FIELD

The present disclosure relates to data encoding conversion, and in particular although not exclusively concerns a coding module for an Ethernet transceiver and associated method and computer program.

BACKGROUND

10BASE-T1S Ethernet is used in automotive applications. For some applications, it is difficult to achieve a suitable bit rate when communicating between nodes in networks with non-linear or complex wiring topologies. The apparatus and associated methods described herein may address this issue.

SUMMARY

According to a first aspect of the present disclosure there is provided a coding module for a transceiver, the coding module comprising circuitry configured to:
  receive data-signalling representative of one or more data words;
  encode the data-signalling into one or more DC-balanced words each having a DC-balanced-word-length;
  provide a prepended-word for a first transmission, wherein a length of the prepended-word is at least as long as the DC-balanced-word-length; and
  provide the one or more DC-balanced words for a second transmission, wherein the second transmission is subsequent to the first transmission.

The one or more data words may be one or more 4B5B words. The transceiver may be an Ethernet transceiver.

The first transmission may immediately precede the second transmission. The first and second transmissions may be considered to be different parts of a single transmission.

In one or more embodiments, the coding module is further configured to provide an appended-word for a third transmission. wherein the appended-word has an appended-word-length at least as long as the DC-balanced-word-length and the third transmission is subsequent to the second transmission.

In one or more embodiments, the coding module is further configured to receive input-signalling representative of the one or more 4B5B words. The coding module may be further configured to remove 4B5B coding from the one or more 4B5B words to generate the data-signalling.

In one or more embodiments, the coding module is further configured to receive a collision-detection signal representative of a collision status of a medium configured to carry the first transmission, the second transmission and a third transmission if there is one. When the collision-detection signal comprises a first value, the coding module may provide the input signalling to an output terminal. When the collision-detection signal comprises a second value, the coding module may provide modified input signalling to the output terminal. The modified input signalling may be different to the input signalling.

In one or more embodiments, the data-signalling comprises a representation of a first 4B5B word and a second 4B5B word and the DC-balanced word is encoded as a 8B10B word.

In one or more embodiments, the coding module is further configured to provide a first value to an Energy Detect ("ED") terminal on receiving the data-signalling. The coding module may be further configured to maintain the first value to the Energy Detect terminal during the first transmission and the second transmission. The coding module may be further configured to provide a second value to the Energy Detect terminal at a predetermined time interval after the second transmission. The predetermined time interval may be at least as long as a transmission time of the DC-balanced-word-length.

According to a further aspect, there is provided a coding module for an Ethernet transceiver, the coding module comprising circuitry configured to:
  receive a prepended-word and provide a first value to an Energy Detect terminal;
  receive one or more DC-balanced words each having a DC-balanced-word-length;
  remove a DC-balanced coding from the one or more DC-balanced words to generate data signalling representative of one or more data words; and
  provide the data signalling to an output terminal.

The one or more data words may be one or more 4B5B words.

In one or more embodiments, the coding module is configured to maintain the first value to the Energy Detect terminal until final-signalling representative of a final word of the one or more data words has been provided to the output terminal. The coding module may then provide a second value, that is different to the first value, to the Energy Detect terminal.

In one or more embodiments, the coding module is further configured to apply a 4B5B coding to the data signalling to generate the one or more 4B5B words.

In one or more embodiments, one or more DC-balanced words are one or more 8B10B words.

In one or more embodiments, the coding module is further configured to suppress sending the prepended-word to the output terminal.

According to a further aspect, there is provided an Ethernet transceiver comprising a coding module described herein, including those above.

In one or more embodiments, the Ethernet transceiver is a 10BASE-T1S transceiver.

The transceiver may be configured to communicate on the signal line using one or more of: NRZ, MLT3, HDB3 and PAM3 encoding.

According to a further aspect there is provided a method of operating an Ethernet transceiver, the method comprising:
  receiving data-signalling representative of one or more data words;
  encoding the data-signalling into one or more DC-balanced words each having a DC-balanced-word-length;
  providing a prepended-word for a first transmission, wherein a length of the prepended-word is at least as long as the DC-balanced-word-length; and
  providing the one or more DC-balanced words for a second transmission, wherein the second transmission is subsequent to the first transmission.

According to a further aspect there is provided a method of operating an Ethernet transceiver, the method comprising:

receiving a prepended-word and providing a logic-high signal to an Energy Detect ("ED") terminal;

receiving one or more DC-balanced words each having a DC-balanced-word-length;

removing a DC-balanced coding from the one or more DC-balanced words to generate data signalling representative of one or more data words; and providing the data signalling to an output terminal.

The methods may be computer-implemented.

Various aspects of the invention may relate to a transceiver that:

modifies a received bit stream before sending it on the physical medium;

modifies the bit stream in a way that the encoded signal is DC-free;

avoids unnecessary overhead when modifying the bit stream;

presents the original TX input on the RX output as long as the medium appears to be free of collisions;

represent a signal on its RX output that intentionally deviates from the TX input when a collision is sensed on the medium; and/or presents an "ED" signal that is prolonged after the actual time where the medium is busy to allow for synchronous release on sender and receiver side of the transmission.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

While much of the focus in recent Ethernet development has centred on high data rates, not every application requires speeds of up to 400 Gbps. For some applications, including Internet of Things (IoT), industrial and automotive, 10 Mbps is sufficient. Factors like cost, weight, distance and the space required for cable are more important for these use cases.

Recognizing these evolving requirements, IEEE began work in early 2017 to define IEEE 802.3cg, a standard for single-pair Ethernet that supports 10 Mbps. The goals of IEEE 802.3cg were to define a point-to-point and a multidrop short-distance standard with a maximum length of 25 meters, and a long-distance point-to-point standard that supports distances up to 1,000 meters. The resulting IEEE 802.3cg specification includes two link-layer standards: 10BASE-T1S and 10BASE-T1L.

The 10BASE-T1S short-range standard is primarily targeted at automotive and industrial applications. Multiple nodes on the network can share a cable in half-duplex shared-medium mode (multidrop mode) using the standard Ethernet Carrier-Sense Multiple Access with Collision Detection (CSMA/CD) access method or operate using PHY-Level Collision Avoidance (PLCA). The cable is an unshielded twisted pair (UTP) that may have multiple medium dependent interfaces (MDIs) attached thereto. As such, 10BASE-T1S may also be referred to as Multidrop Single Pair Ethernet (MSPE).

The 10BASE-T1L long-range option is designed for IoT and industrial control applications. The 1,000-meter range is sufficient for use in large factories or warehouses, and 10 Mbps is sufficient for gathering data from sensors and to monitor and control many types of industrial machinery. It shares the advantages of the short network variant: compatibility with four-pair Ethernet and lower cost, weight and required space.

Figure 1A:
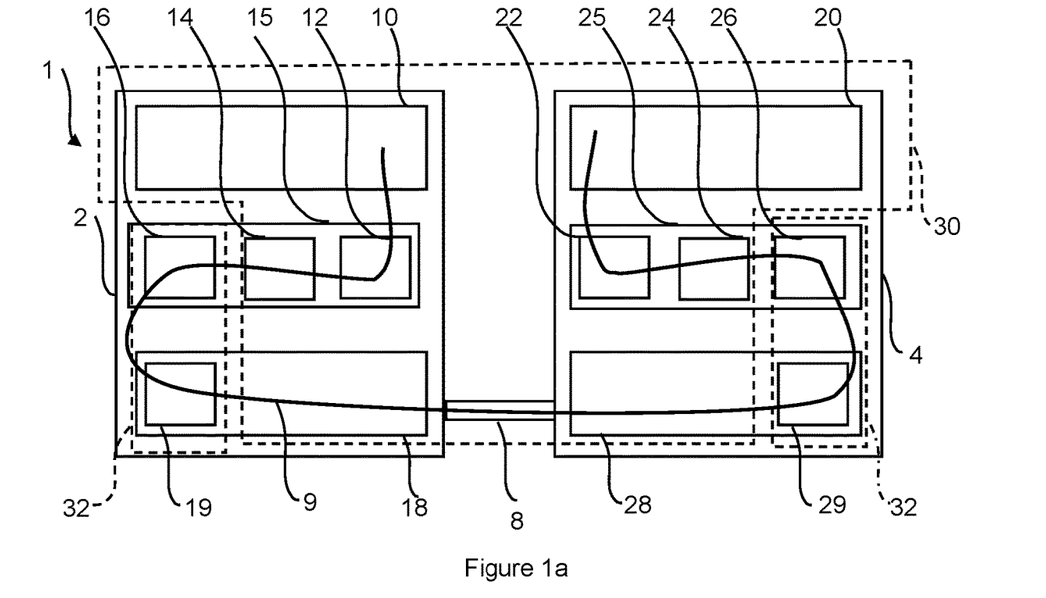
FIG. 1a illustrates a schematic block diagram of an Ethernet network 1 that may be used to implement the 10BASE-T1S protocol.

FIG. 1a illustrates a schematic block diagram of an Ethernet network 1 that may be used to implement the 10BASE-T1S protocol. The network 1 comprises a first node 2 and a second node 4 connected by wire harness 8, which may be provided by a twisted pair of cables, for example.

Each node 2, 4 comprises an Ethernet stack including an Ethernet MAC 10, 20, a so called digPHY entity 15, 25 and a "PMD transceiver" 18, 28. Each digPHY entity 15, 25 provides various encoding or decoding functions as defined for the PCS Layer in IEEE802.3cg.

For example, when the first node 2 is acting as a transmitter and the second node 4 is acting as a receiver, the transmit digPHY entity 15 comprises a 4B5B encoder 12, a Differential Manchester Encoding (DME) encoder 14 and a pulse encoder 16 to provide a signal for the PMD transceiver 18 of the first node 2. Similarly, when the second node 4 is acting as a receiver, the receive digPHY entity 25 comprises a de-pulse decoder 26, an DME decoder 24 and a 4B5B decoder 22.

The PMD transceiver 18 acting in transmit mode comprises a de-pulse stage 19 configured to receive data from the transmit digPHY entity 15 of the first node 2, and the receive PMD transceiver 28 comprises a pulse stage 29 configured to provide a signal to the digPHY entity 25 of the second node 4.

FIG. 1a further illustrates a data path from the Ethernet MAC 10 of the first node 2 to the Ethernet MAC 20 of the second node 4. The data path 9 passes sequentially from the transmit Ethernet MAC 10 to the transmit digPHY entity 15, passing through the 4B5B encoder 12, the DME encoder 14 and the pulse encoder 16, to the transmit PMD transceiver 18 comprising the de-pulse stage 19. The transmit PMD transceiver 18 encodes the signal for transmission on the wire harness 8, or network line, from the first node 2 to the second node 4 where it is received by the receive PMD transceiver 28. In the second node 4, the data path 9 passes from the receive PMD transceiver 28 having the pulse stage 29 to the receive digPHY entity 25, passing through the de-pulse stage 26, the DME decoder and the 4B5B decoder 22, to the receive Ethernet MAC 20.

Aspects 30 of the operation of the Ethernet system are defined by the IEEE 802.3cg standard and other aspects 32 are defined by the OpenAlliance TC14 standard.

Some aspects of the present disclosure are directed to aspects of the operation of the transceiver that are proposed to deviate from the IEEE 802.3cg standard.

Figure 1B:
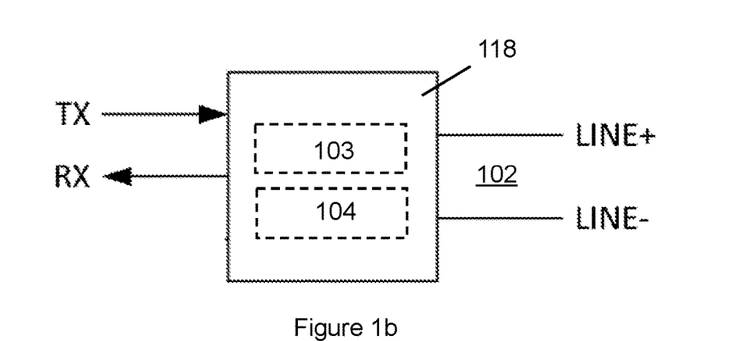
FIG. 1b shows one example of an Ethernet transceiver connected to a signal line.

FIG. 1b shows one example of an Ethernet transceiver 118 connected to a signal line 102, or bus, by network signalling terminals. The signal line 102 comprises positive (LINE+) and negative (LINE−) lines formed as an unshielded twisted pair (UTP) suitable for conveying differential voltage signals, and the Ethernet transceiver 118 comprises a corresponding pair of signal pins configured for connection to the respective lines of the UTP.

The Ethernet transceiver 118 further comprises a transmitter module 103 for processing outgoing (egress) data into a suitable signal form for transmission to other nodes on the Ethernet network and a receiver module 104 for processing incoming signals from other nodes on the Ethernet network into a suitable data form for the higher layers of the protocol stack.

In this example, an Ethernet Physical Layer (PHY) is split into a digital PHY (digPHY) part and an analog frontend part, as described previously with reference to FIG. 1a. The PMD transceiver shown in FIG. 1b is the analog front end part and is configured to interface with the digital PHY using three pins: a transmit pin TX for conveying outgoing data from the digital PHY to the transmission module 103 and a receive pin RX for conveying incoming (ingress) data from the receiver module 104 to the digital PHY.

10BASE-T1S as specified in IEEE802.3cg uses Differential Manchester Decoding (DME) on the physical medium (signal line/bus). Two signal changes per bit may occur per using DME. This limits the practicable wire harness topologies and the bit rates. Other coding schemes like NRZ do only have one signal change per transmitted bit and thus are more suitable for in-vehicle wire harnesses. It will be appreciated that there are various means for substituting the DME code with NRZ, which may be implemented at various points in the node, and are not the focus of the present disclosure. For example, the skilled person would appreciate that the digPHY layer could be configured to encode/decode NRZ rather than DME, albeit deviating from the IEEE802.3cg standard.

In the present disclosure, it is noted that NRZ is different to DME in that NRZ is not DC-free, so if DME code on the bus is substituted by NRZ code, further manipulations in the bit stream may be applied to keep the DC-free, or near DC-free, property of the signal.

Figure 2A:
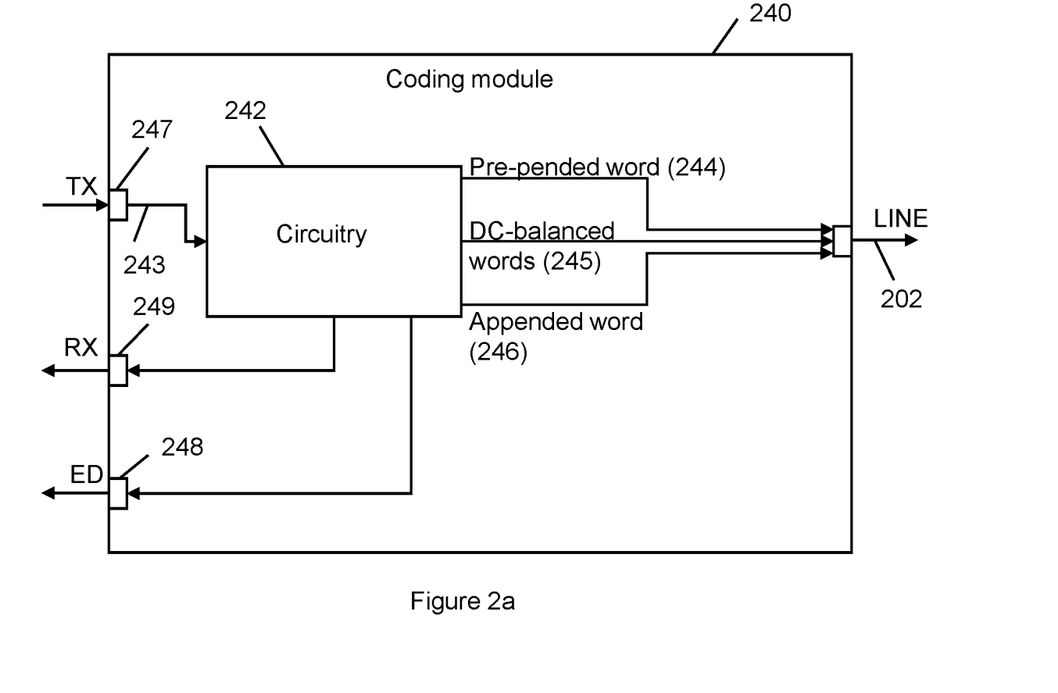
FIG. 2a illustrates an example of a coding module for an Ethernet transceiver.

FIG. 2a shows an example embodiment of a coding module 240 for an Ethernet transceiver, such as the Ethernet transceiver that is illustrated in FIGS. 1a and 1b. The coding module 240 of FIG. 2a will be used to describe the functionality of the Ethernet transceiver when it transmits information on to a signal line (LINE) 202. As discussed above, the signal line 202 can include a positive and a negative line for conveying differential voltage signals.

Figure 2B:
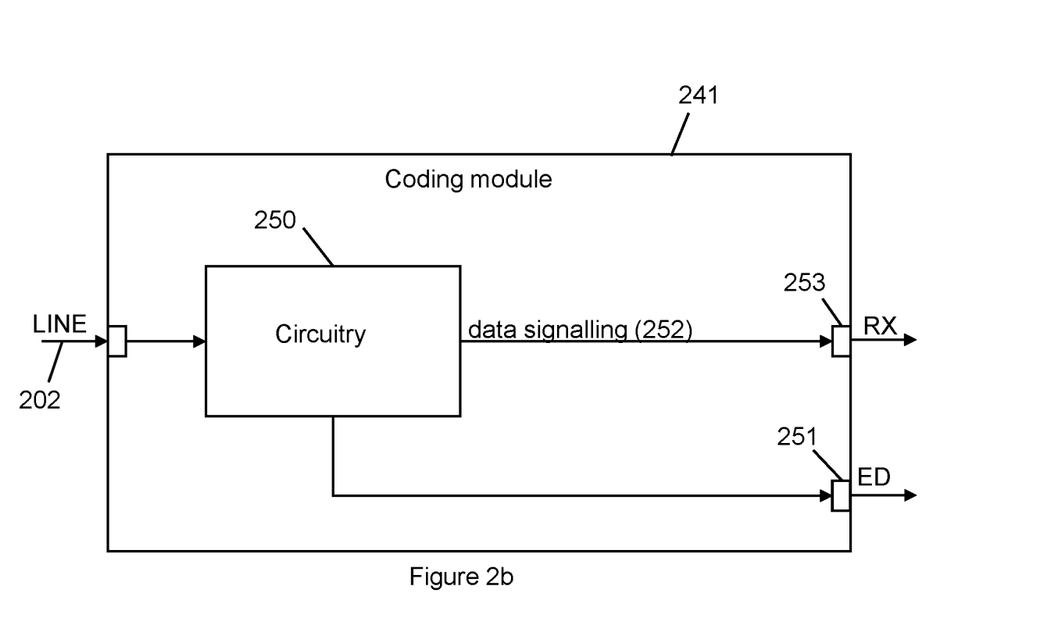
FIG. 2b illustrates another example of a coding module 241 for an Ethernet transceiver.

FIG. 2b shows another example embodiment of a coding module 241 for an Ethernet transceiver, such as the Ethernet transceiver that is illustrated in FIGS. 1a and 1b. The coding module 241 of FIG. 2b will be used to describe the functionality of the Ethernet transceiver when it receives information from a signal line (LINE) 202. The signal line 202 that is shown in FIGS. 2a and 2b may the same signal line, such that the coding module 241 of FIG. 2b receives information that is transmitted by the coding module 240 of FIG. 2a. Of course, it will be appreciated that a single coding module can provide the functionality of both FIGS. 2a and 2b since the coding modules 240, 241 are for an Ethernet transceiver that can both transmit and receive information. The Ethernet transceivers of FIGS. 2a and 2b are 10BASE-T1S transceivers in this example.

Returning to FIG. 2a, the coding module 240 has circuitry 242 that receives input-signalling 243 representative of one or more 4B5B words from a TX-terminal 247 (which is an example of an input-terminal). In this example the input-signalling 243 will be referred to as data-signalling, although in another example (that is described below) the circuitry 242 can perform some pre-processing on the input-signalling 243 to provide the data-signalling for further processing by the circuitry 242. The circuitry 242 receives the input-signalling 243 from a TX terminal 247. The TX terminal 247 can be considered as being associated with the coding module 240 or the Ethernet transceiver with which the coding module 240 is associated.

The circuitry 242 encodes the data-signalling into one or more DC-balanced words each having a DC-balanced-word-length. This encoding is performed in order to reduce or remove any DC components on a bit stream that is represented by the data-signalling. In one example, the circuitry 242 adds a coding such as 8B10B to make the bit stream DC-free. In such an example: the data-signalling comprises a representation of a first 4B5B word and a second 4B5B word; and the circuitry 242 encodes the first 4B5B word and the second 4B5B word such that the DC-balanced word is encoded as a 8B10B word.

The circuitry 242 sequentially provides at least a first transmission and a second transmission to the signal line 202 for transmitting to another Ethernet transceiver.

The circuitry 242 provides a prepended-word 244 for the first transmission. A length of the prepended-word 244 is at least as long as the DC-balanced-word-length that is identified above with reference to encoding the data-signalling into the one or more DC-balanced words. This prepended-word 244 can be implemented as preamble bits, for example. The circuitry 242 then provides the one or more DC-balanced words 245 for the second transmission. The second transmission is subsequent to the first transmission, as will be described further below with reference to the timing diagram in the accompanying drawings.

In this example, the circuitry 242 also provides an appended-word 246 for a third transmission, which is subsequent to the second transmission. Such a third transmission is optional because it can be omitted in some implementations. In the same way as the prepended-word 244, the appended-word 246 also has an appended-word-length at least as long as the DC-balanced-word-length. In some applications, one or both of the prepended-word 244 and the appended-word 246 are the same length as the DC-balanced-word-length. DC-balanced words allow for the use of capacitive coupling of the PMD to the physical media.

In some examples, the received input-signalling 243 is representative of the one or more 4B5B words, and the circuitry 242 removes 4B5B coding from the one or more 4B5B words to generate the data-signalling that is subsequently encoded by the circuitry 242 into the one or more DC-balanced words. Such removal of the 4B5B coding from the one or more 4B5B words in the input-signalling 243 can be considered as an optional pre-processing step. Removing the 4B5B coding in this way can advantageously avoid unnecessary overhead.

As shown in FIG. 2a, the coding module 240 (or at least the Ethernet transceiver with which the coding module 240 is associated) includes an Energy Detect (ED) terminal 248. The circuitry 242 can provide a first-value signal (which in this example is a logic-high signal) to the Energy Detect terminal 248 on receiving the data-signalling. The circuitry 242 then maintains the first-value/logic-high signal to the Energy Detect terminal 248 during at least the first transmission and the second transmission. In this example, the circuitry 242 provides a second-value signal (in this example a logic-low signal), which is different to the first-value signal, to the Energy Detect terminal 248 at a predetermined time interval after the second transmission. That is, the signal provided to the Energy Detect terminal 248 is changed after a predetermined time interval following the end of the second transmission to signify the end of the detected energy. The predetermined time interval can be at least as long as a transmission time of the DC-balanced-word-length. In this way, if the circuitry 242 provides an appended-word 246 for a third transmission, then the signal provided to the Energy Detect terminal 248 is maintained at the first-value/logic-high also during the third transmission.

In this example, the coding module 242 also has an RX terminal 249 (which is an example of an output-terminal). The circuitry 242 can also receive a collision-detection signal (not shown) that is representative of a collision status of a medium configured to carry the first transmission, the second transmission and a third transmission if there is one. As discussed above, such a medium can be an unshielded twisted pair (UTP) that provides the signal line 202 connection between the coding module 240 of FIG. 2a and the coding module 241 of FIG. 2b. When the collision-detection signal comprises a first value (in this example a logic-low value), the circuitry 242 provides the input signalling 243 to the RX terminal 249. In this way, the received input signalling 243 is provided to the RX terminal 249 without being changed by the circuitry 242 if there is no identified collision. When the collision-detection signal comprises a second value (in this example a logic-high value), the circuitry 242 provides modified input signalling 243 to the RX terminal 249. The modified input signalling is different to the input signalling; for example it can be intentionally corrupted in order to signify that a collision has been detected.

Turning now to FIG. 2b, the coding module 250 includes circuitry 250 for processing signals received over the signal line 202. When the circuitry 250 receives a prepended-word (such as the one described above with reference to FIG. 2a), it provides a first-value/logic-high signal to an Energy Detect terminal 252. In some examples, the circuitry 250 can maintain the first-value/logic-high signal to the Energy Detect terminal 251 until final-signalling representative of a final word of the one or more 4B5B words has been provided to an RX terminal 253.

The circuitry 250 can also receive one or more DC-balanced words over the signal line 202, each DC-balanced word having a DC-balanced-word-length (again, as described above with reference to FIG. 2a). In this example, the one or more DC-balanced words are one or more 8B10B words, although in other examples different DC-free encodings can be used. The circuitry 250 removes a DC-balanced coding from the one or more DC-balanced words to generate data signalling 252. Such DC-balanced coding is present in the received DC-balanced words due to the encoding that is performed at the coding module that generates and provides the one or more DC-balanced words (such as the one that is described above with reference to FIG. 2a). In the same way as described above, the data signalling 252 is representative of one or more 4B5B words. In some examples, the coding module 250 can apply a 4B5B coding to the data signalling 252 to generate the one or more 4B5B words. The circuitry 250 then provides the data signalling 252 to an output terminal (which in this example is the RX terminal 253). Optionally, the circuitry 250 can suppress sending the prepended-word, or the "append-word" from the third transmission, to the RX terminal 253. That is, the prepended-word or append-word may not be provided to the RX terminal 253.

Figure 2C:
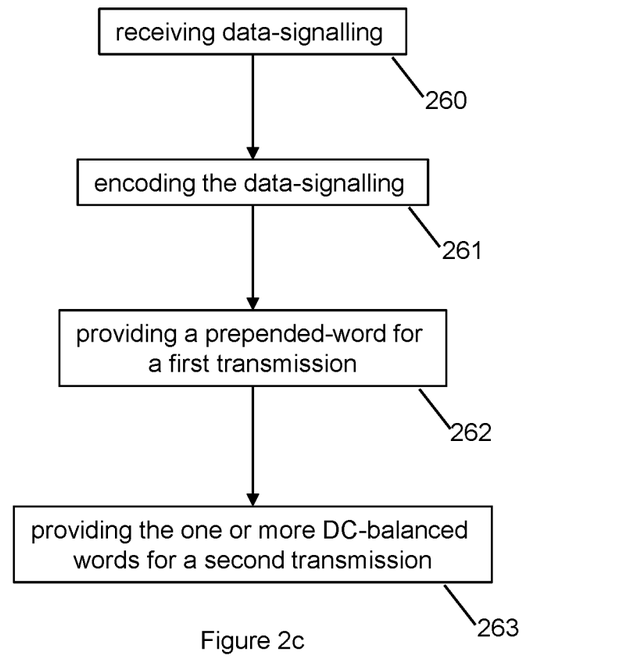
FIG. 2c illustrates an example of a method of operating an Ethernet transceiver.

FIG. 2c shows an example embodiment of a method of operating an Ethernet transceiver according to the present disclosure, which may be a computer-implemented method. The method of FIG. 2c can be performed by the coding module of FIG. 2a.

The method includes, at step 260, receiving data-signalling representative of one or more 4B5B words. Then, at step 261, the method includes encoding the data-signalling into one or more DC-balanced words each having a DC-balanced-word-length. At step 262, the method includes providing a prepended-word for a first transmission, wherein a length of the prepended-word is at least as long as the DC-balanced-word-length. Then, at step 263, the method includes providing the one or more DC-balanced words for a second transmission, wherein the second transmission is subsequent to the first transmission.

Figure 2D:
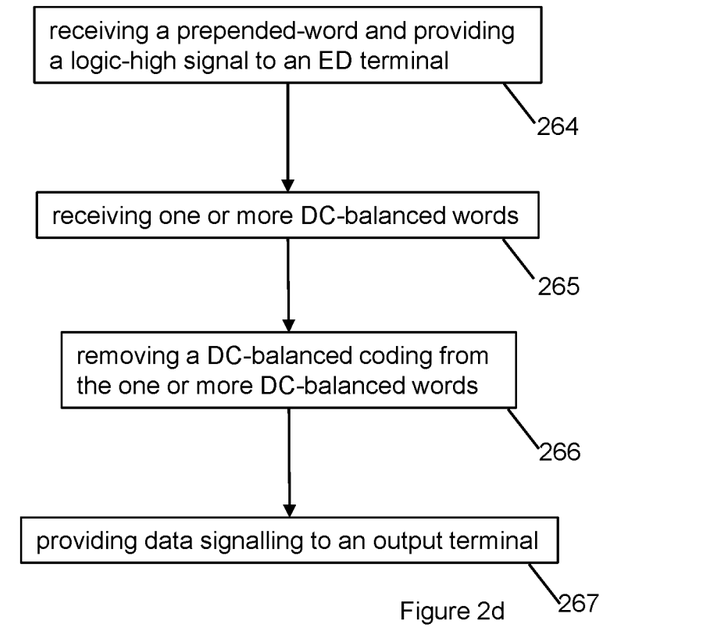
FIG. 2d illustrates another example of a method of operating an Ethernet transceiver.

FIG. 2d shows an example embodiment of a method of operating an Ethernet transceiver according to the present disclosure, which may be a computer-implemented method. The method of FIG. 2d can be performed by the coding module of FIG. 2b.

At step 264, the method includes receiving a prepended-word and providing a logic-high signal to an Energy Detect terminal. At step 265, the method includes receiving one or more DC-balanced words each having a DC-balanced-word-length. Then at step 266, the method includes removing a DC-balanced coding from the one or more DC-balanced words to generate data signalling representative of one or more 4B5B words. At step 267, the method includes providing the data signalling to an output terminal.

In this way, the modules described with reference to FIGS. 2a and 2b, or the methods described with reference to FIGS. 2c and 2d, may perform an on-the-fly translation of the line coding between its digital IOs and the physical medium, while adding significant, but acceptable, delays for the sake of a DC-free encoding even with NRZ signalling on the medium.

Figure 3:
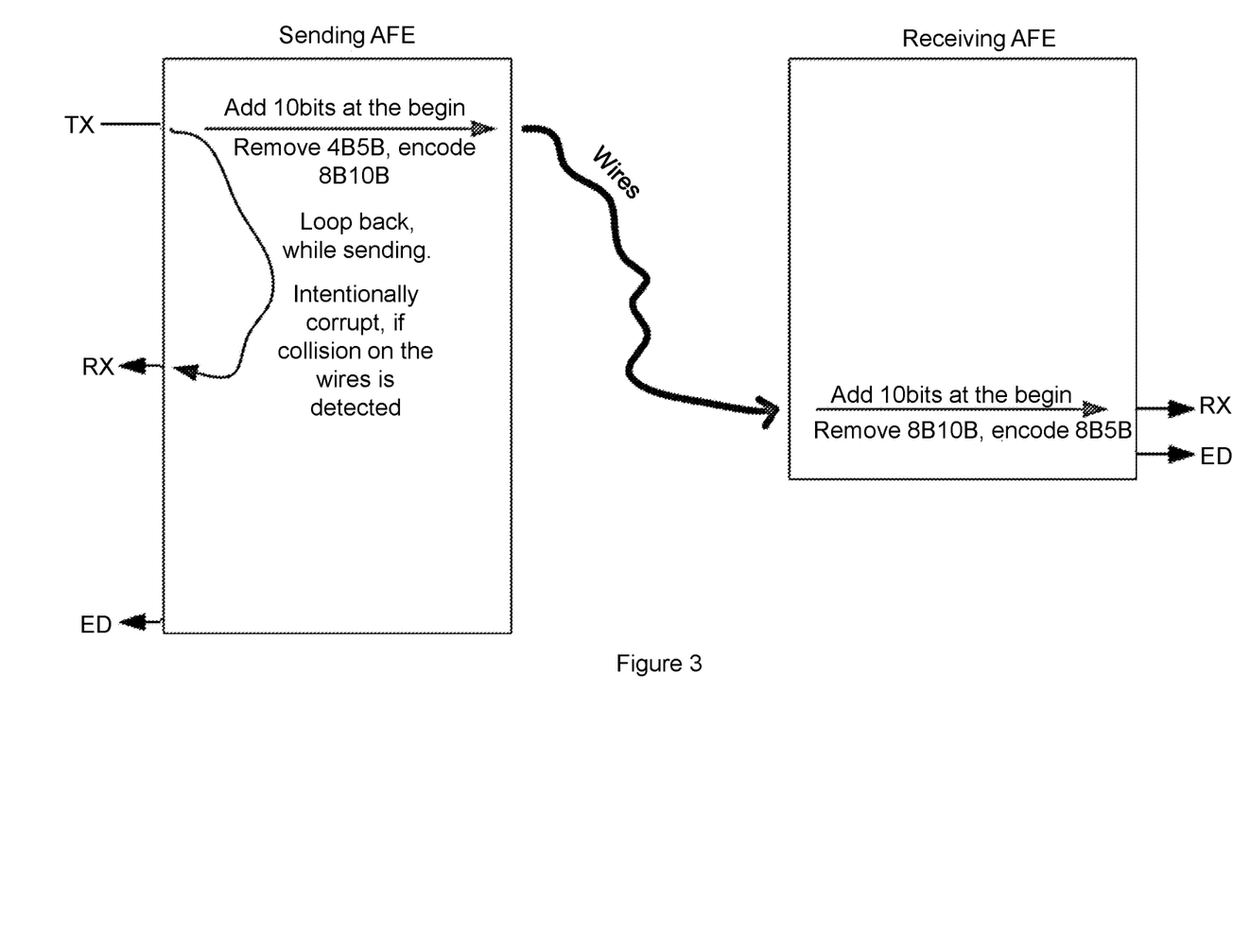
FIG. 3 illustrates a system comprising a first transceiver and a second transceiver connected by a signal line.

FIG. 3 illustrates a system comprising a first transceiver, or AFE, 302 and a second transceiver, or AFE, 304 connected by a signal line, or bus, 306. The first transceiver 302 is acting as a transmitter and the second transceiver 304 is acting as a receiver, and the first and second transceivers 302, 304 may be provided in respective nodes in a vehicle, for example. Each node may comprise the other Ethernet entities, such as the digital PHY (digPHY) part of the Ethernet Physical Layer (PHY). The signal line 306 may be provided by wires, or a wire harness.

The first transceiver 302 has a transmit input (TX), a receive output (RX) and an ED signal output (ED), as well as signal line terminals coupled to the signal line 306. The second transceiver also has a receive output (RX) and an ED signal output (ED), as well as signal line terminals coupled to the signal line 306. It will be appreciated that a transmit input (not shown) of the second transceiver is not necessarily active when the second transceiver 304 is acting as a receiver.

When a frame is sent from the digPHY (not shown) via the TX input to the first AFE 302, the first AFE 302 sends a preamble of 10 bits on the physical medium (wires) of the signal line 206. When 10 bits have been received on TX input to the first AFE 302, then 4B5B coding can be removed and the resulting two nibbles can be 8B10B encoded. Alternatively 4B5B coding may not be removed and 8B10B coding can be added after 8 bits have been received, which then might require an increase in the bit rate on the physical medium to compensate the further overhead.

The receiving, second AFE 304 asserts its ED signal to a digPHY (not shown) of the second node as soon as the signal line appears to be busy. The second AFE 304 may supress the preamble added by the sending, first AFE 302, in the signal provided for the digPHY of the second node at the RX output of the second AFE 304. Alternatively, if the preamble cannot be misinterpreted as a SYNCH, BEACON or HB symbol, the second transceiver could provide the preamble in the signal at the RX output to the digPHY.

As soon as 10 bits have been received, the 8B10B coding can be removed by the second AFE 304, and the resulting byte can be 4B5B encoded and presented to the digPHY of the second node. At the end of the frame the ED is kept asserted until the last byte has been transmitted to the digPHY.

On the sender side, at the first AFE 302, the bit stream on RX output reflects the bit stream on TX input, as long as no collision is detected by the first AFE 302 on the medium in order to not influence collision detection in the PCS layer. Once the first AFE 302 detects a collision on the signal line, the RX output may be set to present a bit stream that differs from the bit stream on the TX input, for example, inverted TX.

The ED that is presented to the digPHY on the sender side, at the first transceiver 302, is kept asserted for 20 additional bit times after the transmission ended, to ensure that ED is deasserted by the sending, first AFE 302 and the receiving, second AFE 304 at the same point in time.

As described previously, the sending AFE (transceiver) receiving the bit stream from the digPHY and adding a coding such as 8B10B allows the bit stream to be made DC-free, or at least substantially DC-free. Advantageously the 4B5B coding can be removed to avoid unnecessary overhead. Additional preamble bits are put on the line prior the first newly coded bits of the message. The receiver in the sending AFE present an unchanged signal to the sending digPHY as long as the bus appears without collision. The receiving AFE asserts ED signal as soon as the medium is busy and may suppress the additional preamble. Once the newly coded message is received the coding is changed back to the original coding by the AFE, so the unmodified digPHY can receive the message as specified. The sending AFE keeps its ED signal busy after the end of the own transmission for the time needed in the receiving AFE to perform the re-coding of the last bits.

Figure 4:
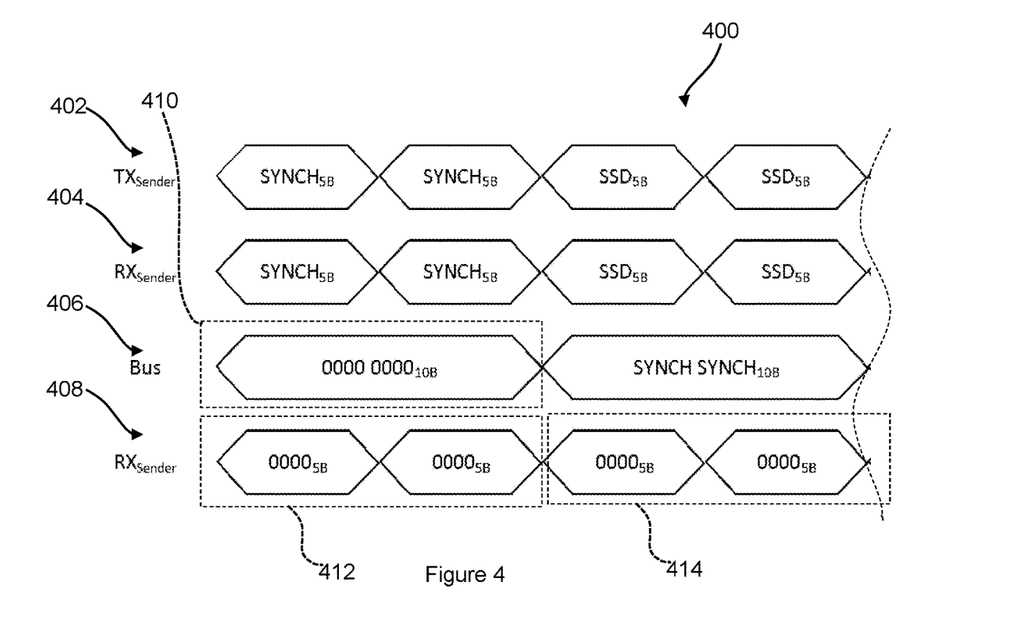
FIG. 4 illustrates a set of signals associated with a start of a transmission.

FIG. 4 illustrates a set of signals 400 associated with the start of a transmission that may be provided for a system as described previously with reference to FIG. 2 or FIG. 3, for example. The set of signals 400 provide timing diagrams of the collision free transmission.

The set of signals 400 contains a $TX_{Sender}$ signal 402, and corresponding signals including a $RX_{Sender}$ signal 404, a BUS (signal line) signal 406 and a $RX_{Receiver}$ signal 408.

The $TX_{Sender}$ signal 402 includes a series of 4B5B words: SYNCH, SYNCH, SSD, SSD, data, etc. The $RX_{Sender}$ signal 404 corresponds to the $TX_{Sender}$ signal 402.

In this examples, frames on the BUS signal 406 are provided in 8B10B code. In the BUS signal 406, a pre-appended DC-balance word 410, has been inserted by the sender transceiver (AFE) to allow processing of the first two 4B5B codes in the frame. Here exemplarily a "0" is shown, but also other values can be used. The subsequent DC-balanced words in the BUS signal 406 relate to 8B10B code versions of the 4B5B codes of the $TX_{Sender}$ signal 402: SYNCH SYNCH, SSD SSD, etc.

In the $RX_{Receiver}$ signal 408, the first and second words 412 are pre-append 4B5B codes generated by the receiver while waiting for the first pre-appended DC-balance word 410 of the BUS signal 406 to be completely received. The third and fourth words 414 correspond to the first pre-appended DC-balance word 410 in 8B10B code. In this way, the first four words each provide "0" value 4B5B code word, and are followed by words that correspond with the $TX_{Sender}$ signal 402. Therefore, the fifth word of the $RX_{Receiver}$ signal 408 corresponds to the first word of the $TX_{Sender}$ signal 402.

Figure 5:
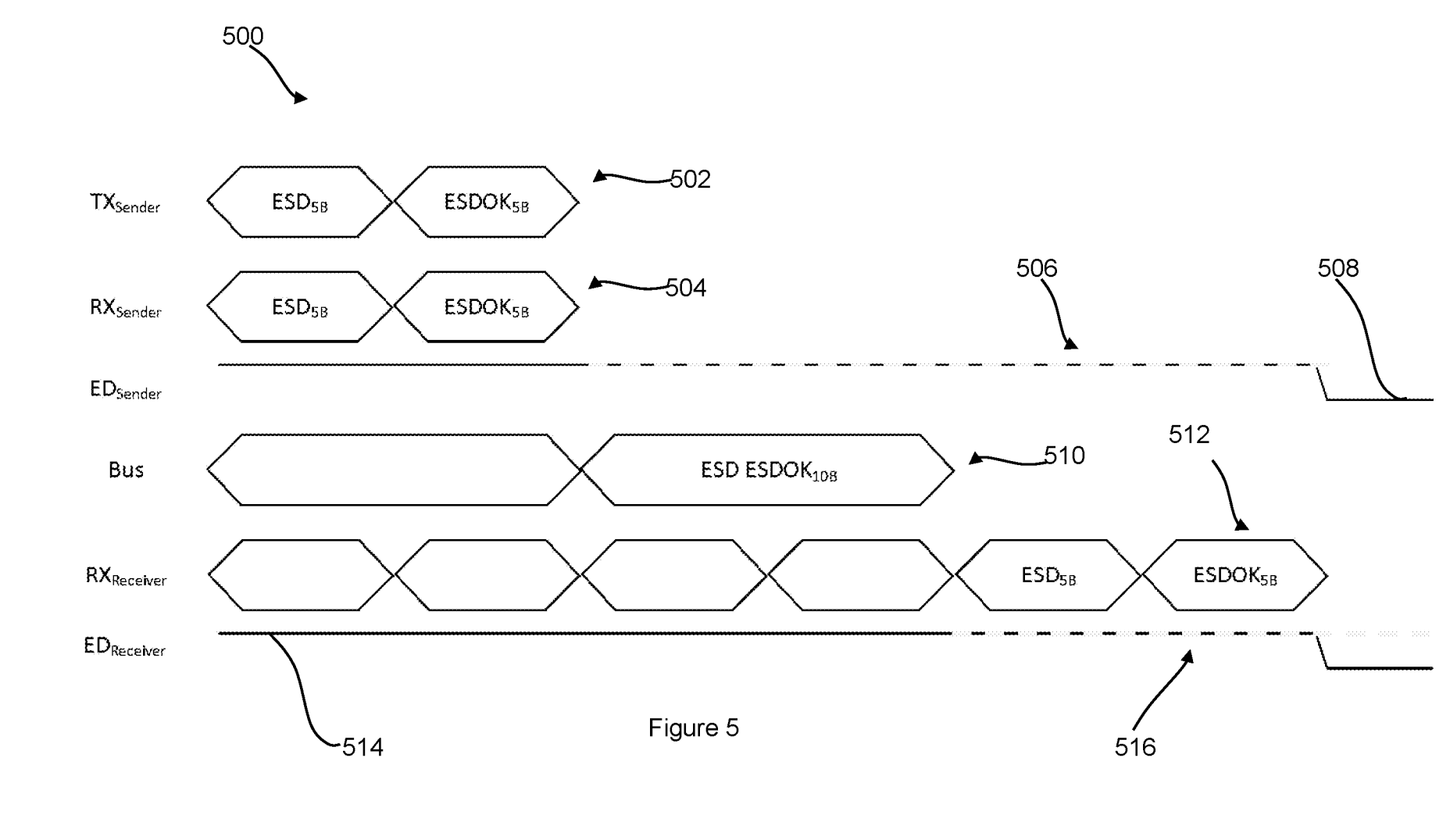
FIG. 5 illustrates a set of signals associated with an end of a transmission.

FIG. 5 illustrates a set of signals 500 associated with the end of a transmission that may be provided for a system as described previously with reference to FIG. 2 or FIG. 3, for example. The set of signals 500 provide timing diagrams of the collision free transmission.

The set of signals 500 contains those described previously with reference to FIG. 4, a $TX_{Sender}$ signal 502, and corresponding signals including a $RX_{Sender}$ signal 504, a BUS signal 510 and a $RX_{Receiver}$ signal 512. In addition, an $ED_{Sender}$ signal 508 and $ED_{Receiver}$ signal 514 is further illustrated in FIG. 5.

The $TX_{Sender}$ signal 502 includes a series of 4B5B codes denoting the end of the frame: ESD, ESDOK. The $RX_{Sender}$ signal 504 corresponds to the $TX_{Sender}$ signal 502.

The $ED_{Sender}$ signal 508 is logic high when a signal is present at the TX terminal of the sender transceiver. In addition, in the dotted period 506, the $ED_{Sender}$ signal 508 is kept high longer than the period in which the $TX_{Sender}$ signal 502 has content in order to avoid collision on the bus. Although the transmitter has stopped delivering data to the bus, the data has not yet been received in the dotted period 506 due to the time the conversion takes. In the dotted period 506, the transmitter shall see the physical medium as "busy" until the receiver has finished the re-coding to prevent the transmitter from starting the next transmission.

In this examples, frames on the BUS signal 510 are provided in 8B10B code. In the BUS signal 510, a final (8B10B) word 410 (ESD ESDOK) is delayed by a word period of the BUS compared to the corresponding 4B5B codes (ESD, ESDOK) in the $TX_{Sender}$ signal 502.

The $ED_{Receiver}$ signal 514 is logic high when a signal is present on the BUS. In the dotted period 516, the $ED_{Receiver}$ signal 512 is longer than the period in which the BUS signal 510 is sensed to have content at account for the conversion time at the receiver. The $RX_{Receiver}$ signal 512 is active for the same period as the $ED_{Receiver}$ signal 514. That is, the $RX_{Receiver}$ signal 512 is delayed by a word period of the BUS signal compared to the BUS signal (in this example, 1× 4B5B or 2× 8B10B). The delay in the $ED_{Receiver}$ signal 512 prevents the receiver from initiating a transmission during conversion time after the end of the frame.

It will be appreciated that other DC-free encodings than 8B10B can be used as an alternative or on top of 4B5B.

Figure 6:
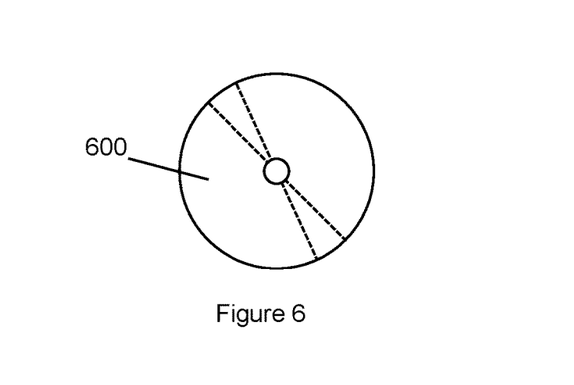
FIG. 6 illustrates a non-transitory computer-readable storage medium.

FIG. 6 illustrates a non-transitory computer-readable storage medium 600 comprising computer program code configured to cause one or more processors to execute the method described previously with reference to FIG. 2c or 2d, or portions thereof, or any other method described herein. A such, an apparatus comprising one or more processors and a memory comprising the computer program code may also be provided.

While various examples herein relate to the use of a modified transceiver for communicating with a Ethernet digital physical (digPHY) layer in accordance with IEEE802.3cg, the disclosed transceivers may find other applications for replacing or modifying other systems that usually operated with a DME or NRZ bus, for example, to achieve similar benefits.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A coding module for an Ethernet transceiver, the coding module comprising circuitry configured to:
   receive data-signaling representative of one or more data words;
   encode the data-signaling into one or more DC-balanced words each having a DC-balanced-word-length;
   provide a prepended-word for a first transmission, wherein a length of the prepended-word is at least as long as the DC-balanced-word-length; and
   provide the one or more DC-balanced words for a second transmission, wherein the second transmission is subsequent to the first transmission, wherein the first and second transmissions are different parts of a single transmission.

2. The coding module of claim 1, further configured to provide an appended-word for a third transmission, wherein the appended-word has an appended-word-length at least as long as the DC-balanced-word-length and the third transmission is subsequent to the second transmission.

3. The coding module of claim 1, wherein the one or more data words comprise one or more 4B5B words.

4. The coding module of claim 3, wherein the coding module is further configured to:
   receive input-signaling representative of the one or more 4B5B words; and
   remove 4B5B coding from the one or more 4B5B words to generate the data-signaling.

5. The coding module of claim 4, wherein the data-signaling comprises a representation of a first 4B5B word and a second 4B5B word.

6. The coding module of claim 1, the DC-balanced word is encoded as a 8B10B word.

7. The coding module of claim 1, further configured to:
   receive a collision-detection signal representative of a collision status of a medium configured to carry the first transmission, the second transmission and a third transmission if there is one;
   wherein:
     when the collision-detection signal comprises a first value, provide input signaling to an output terminal; and
     when the collision-detection signal comprises a second value, provide modified input signaling to the output terminal, wherein the modified input signaling is different to the input signaling.

8. The coding module of claim 1, further configured to:
   provide a first value to an Energy Detect terminal on receiving the data-signaling;
   maintain the first value to the Energy Detect terminal during the first transmission and the second transmission; and provide a second value to the Energy Detect terminal at a predetermined time interval after the second transmission, wherein the predetermined time interval is at least as long as a transmission time of the DC-balanced-word-length.

9. An Ethernet transceiver comprising the coding module of claim 1.

10. The Ethernet transceiver of claim 9, wherein the Ethernet transceiver is a 10BASE-T1S transceiver.

11. A coding module for an Ethernet transceiver, the coding module comprising circuitry configured to:
receive a prepended-word and provide a first value to an Energy Detect terminal;
receive one or more DC-balanced words each having a DC-balanced-word-length;
remove a DC-balanced coding from the one or more DC-balanced words to generate data signaling representative of one or more data words;
provide the data signaling to an output terminal; and
maintain the first value to the Energy Detect terminal until final-signaling representative of a final word of the one or more data words has been provided to the output terminal.

12. The coding module of claim 11, further configured to apply a 4B5B coding to the data signaling to generate one or more 4B5B words.

13. The coding module of claim 11, wherein the one or more DC-balanced words are one or more 8B10B words.

14. The coding module of claim 11, further configured to provide a second value, that is different to the first value, to the Energy Detect terminal following the period in which the first value is maintained.

15. The coding module of claim 11, further configured to suppress sending the prepended-word to the output terminal.

16. An Ethernet transceiver comprising the coding module of claim 11.

17. The Ethernet transceiver of claim 16, wherein the Ethernet transceiver is a 10BASE-T1S transceiver.

18. A coding module for an Ethernet transceiver, the coding module comprising circuitry configured to:
receive data-signaling representative of one or more data words;
encode the data-signaling into one or more DC-balanced words each having a DC-balanced-word-length;
provide a prepended-word for a first transmission, wherein a length of the prepended-word is at least as long as the DC-balanced-word-length;
provide the one or more DC-balanced words for a second transmission, wherein the second transmission is subsequent to the first transmission;
receive a collision-detection signal representative of a collision status of a medium configured to carry the first transmission, the second transmission and a third transmission if there is one;
wherein;
when the collision-detection signal comprises a first value, provide input signaling to an output terminal; and
when the collision-detection signal comprises a second value, provide modified input signaling to the output terminal, wherein the modified input signaling is different to the input signaling.

* * * * *